(No Model.) 5 Sheets—Sheet 1.

J. GRANT.
MACHINE FOR MAKING BEAM HANGERS.

No. 494,102. Patented Mar. 21, 1893.

Witnesses:
Louis M. F. Whitehead.
Sidney W. Brainard.

Inventor:
John Grant.
By Dayton
Poole & Brown
his Attorneys (No Model.)  5 Sheets—Sheet 2.

J. GRANT.
MACHINE FOR MAKING BEAM HANGERS.

No. 494,102.  Patented Mar. 21, 1893.

Witnesses:
Louis M. F. Whitehead.
Sidney W. Brainard.

Inventor:
John Grant.
by Dayton, Poole & Brown
his Attorneys.

(No Model.) 5 Sheets—Sheet 3.

J. GRANT.
MACHINE FOR MAKING BEAM HANGERS.

No. 494,102. Patented Mar. 21, 1893.

(No Model.) 5 Sheets—Sheet 4.

J. GRANT.
MACHINE FOR MAKING BEAM HANGERS.

No. 494,102. Patented Mar. 21, 1893.

Witnesses:
Louis M. F. Whitehead.
Sidney W. Brainard.

Inventor:
John Grant.
by Dayton, Poole & Brown
his Attorneys.

(No Model.)  
J. GRANT.  
MACHINE FOR MAKING BEAM HANGERS.  
No. 494,102.  
Patented Mar. 21, 1893.  
5 Sheets—Sheet 5.

Witnesses:—
Louis M. F. Whitehead.
Sidney W. Brainard.

Inventor:—
John Grant.
by Dayton, Poole & Brown
His Attorneys

UNITED STATES PATENT OFFICE.

JOHN GRANT, OF CHICAGO, ILLINOIS.

MACHINE FOR MAKING BEAM-HANGERS.

SPECIFICATION forming part of Letters Patent No. 494,102, dated March 21, 1893.

Application filed February 11, 1892. Serial No. 421,186. (No model.)

*To all whom it may concern:*

Be it known that I, JOHN GRANT, of Chicago, in the county of Cook and State of Illinois, have invented certain new and useful Improvements in Beam-Hanger Machines; and I do hereby declare that the following is a full, clear, and exact description thereof, reference being had to the accompanying drawings, and to the letters of reference marked thereon, which form a part of this specification.

This invention relates to machines for forming stirrup irons or beam hangers, such as are used for connecting ceiling joists with their supporting timbers, of that class shown in Letters Patent No. 445,149, granted to me January 20, 1891.

The invention consists in the matters described in the following specification and claimed in the clauses at the close thereof.

In the accompanying drawings.

The machine illustrated is designed to receive a metal blank or strap H, and to automatically, by successive bends, shape said blank or strap into a stirrup or hanger having a central loop or bow $h$, to receive the end of a joist, and hooked arms $h^3 \, h^3$, extending at right angles to the sides or legs $h^2 \, h^2$ of the bow (Fig. 12), such as described in connection with the machine for a similar purpose, forming the subject matter of said prior patent hereinbefore referred to.

The general construction and operation of the machine embodying my present improvements are substantially the same as in the machine described in my said former patent, that is to say, the main frame is provided with a guide passage within which travels a longitudinally reciprocating carriage C, said carriage being provided with a die block D, which acts in conjunction with the die rolls E E and E' E', depending from the upper wall of the guide passage to give the inner right angled bends $h'$ (Fig. 12) to a blank, twisting dies $g^2 \, g^2$ for forming the twists in the legs of the blank acting against the upper wall of the guide passage, and supported by swinging arms, which are pivoted to the carriage, and two bending levers I I, (each carrying a pivoted bending arm J,) which are pivoted to the free ends of said swinging arms; said bending levers and arms acting in conjunction with the front end of the top wall of the guide passage to give the final bends $h^4$ and $h^5$ to the blank.

Figures 1, 5, 6:
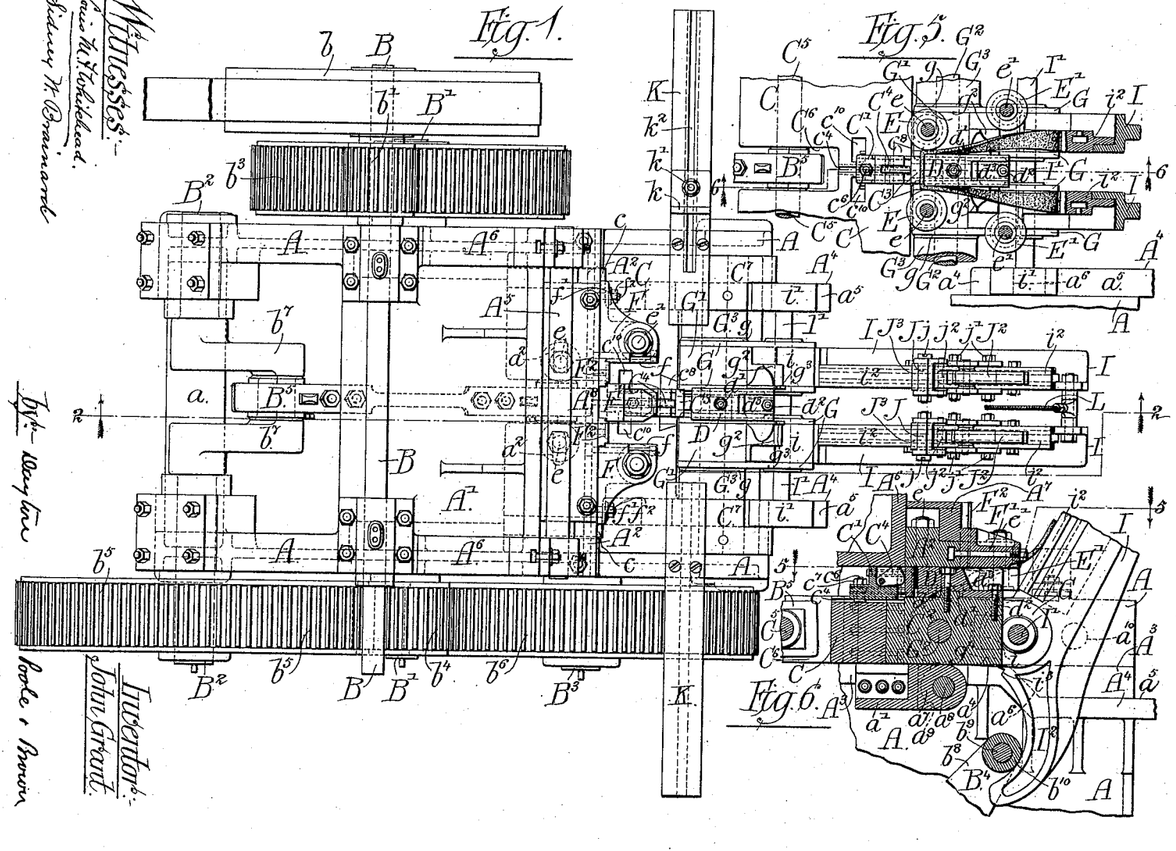
Figure 1 is a plan view of mechanism embodying my improvements, the operating parts being shown in position to receive a blank.
Fig. 5 is a detail in horizontal section, taken on the line 5—5 of Figs. 2 and 6.
Fig. 6 is a vertical section taken on the line 6—6 of Fig. 5.
Figures 2, 7, 8, 9:
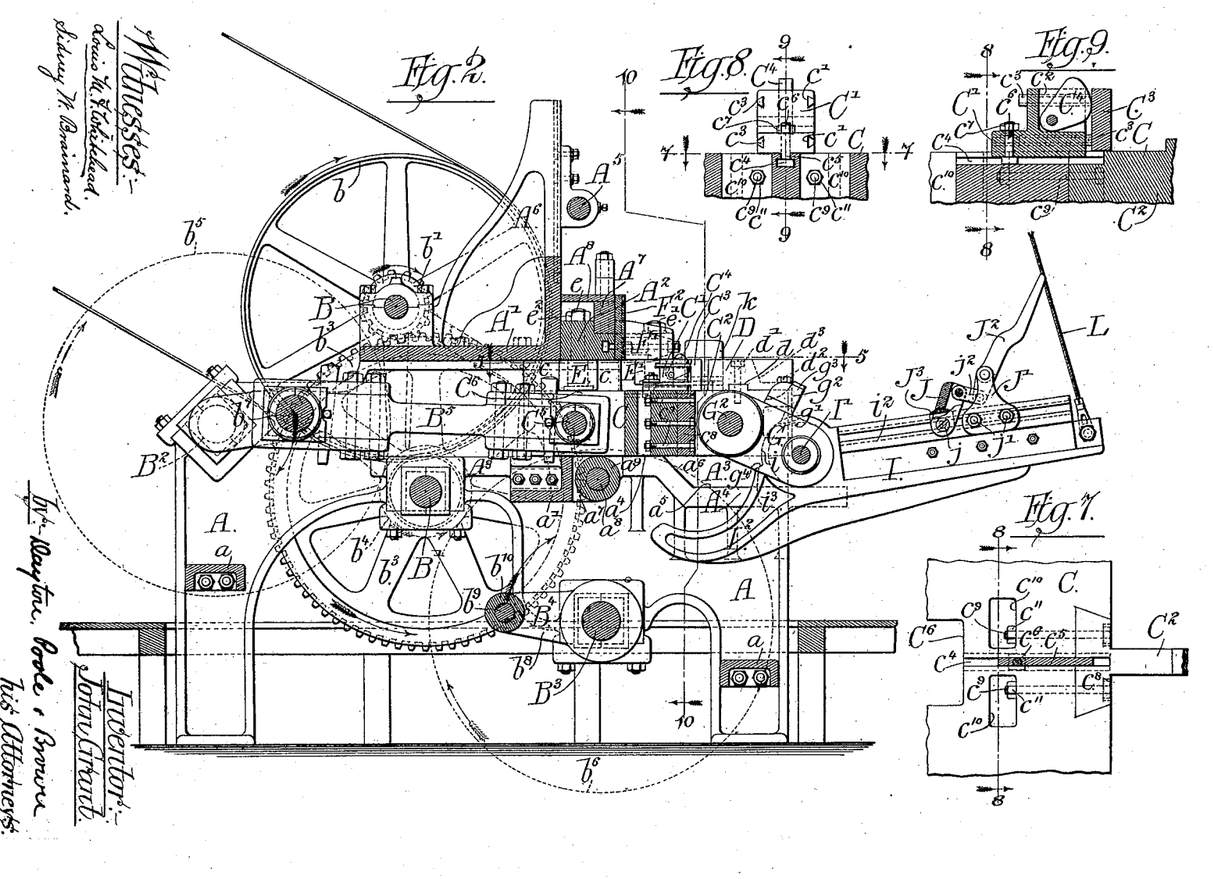
Fig. 2 is a vertical longitudinal section of the same, taken on the line 2—2 of Fig. 1.
Fig. 7 is a horizontal section on the line 7—7 of Fig. 8.
Fig. 8 is a vertical transverse section taken on the line 8—8 of Fig. 7.
Fig. 9 is a vertical longitudinal section on the line 9—9 of Fig. 8.
Figures 3, 4, 12:
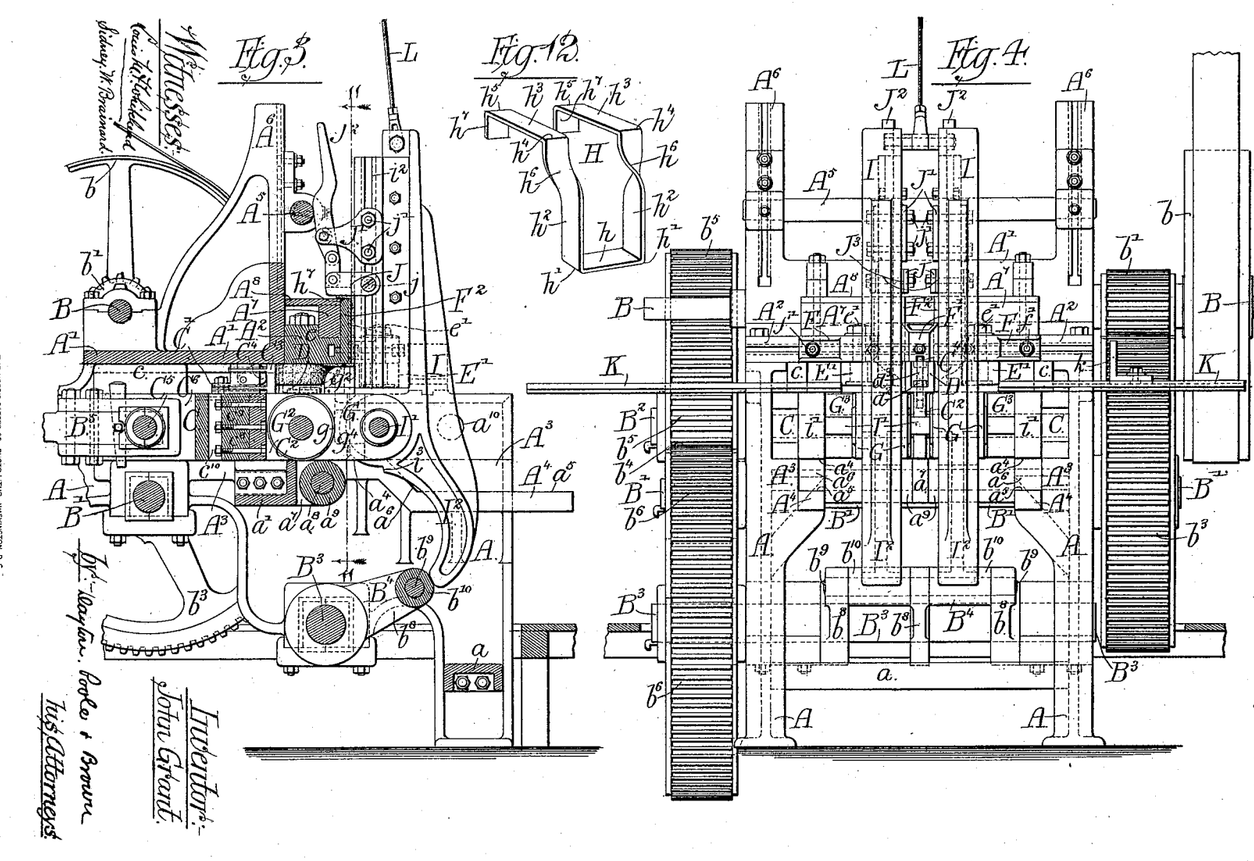
Fig. 3 is a vertical section, taken in the same plane as the section in Fig. 2, the operating parts being shown, however, at the opposite limit of movement, *i. e.* having just completed the final bending of a blank.
Fig. 4 is an end elevation, looking toward the front or feeding end of the machine, the operating parts being shown in the same position as in Fig. 3.
Fig. 12 is a perspective view of a completed stirrup or hanger.
Figure 10:
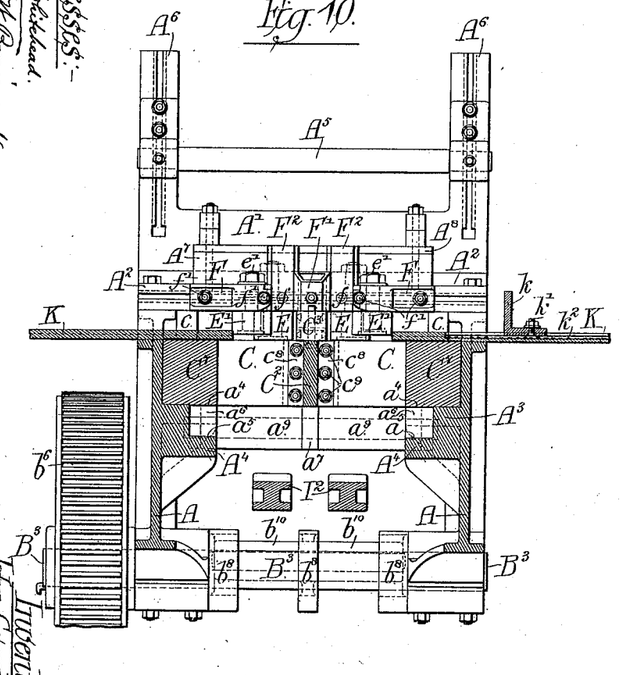
Fig. 10 is a vertical transverse section on line 10—10 of Fig. 7.
Figure 11:
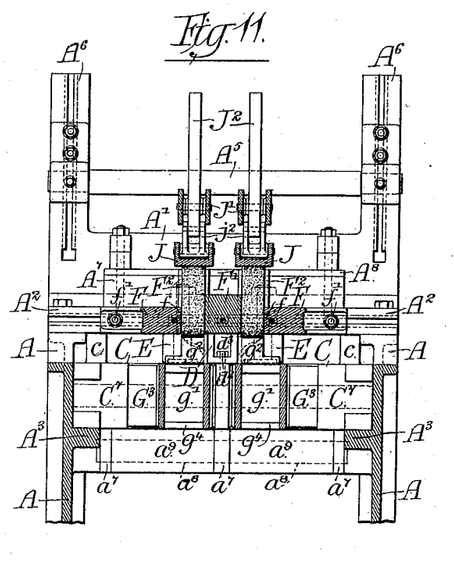
Fig. 11 is a similar view taken on the line 11—11 of Fig. 3.

As illustrated, the main frame is composed of two side frames A A, connected by two end cross-girts $a\,a$, and a central cross-girt $a'$, bolted at their ends to the side frames, and a top plate A' and cross-beam A², bolted to the top edges of said side frames. The side frames are provided with inwardly projecting flanges A³ A³, arranged parallel with the top plate A', and forming, in connection with said top plate and cross-beam, the guide passage for the reciprocating carriage C. The side frames are also provided with horizontal flanges or ways A⁴ A⁴, at the front of the machine, to support and give movement to the outer or free ends of the swinging arms which carry the twisting dies. The two horizontal surfaces $a^4 \, a^5$ of these ways A⁴ are parallel with the flanges A³, the upper surfaces $a^4$ being flush with the tops of said flanges, and said horizontal surfaces $a^4$ and $a^5$ are connected by a surface $a^6$ inclined at an angle of about forty-five degrees to the horizontal, (Figs. 2, 3 and 6.)

The main shaft B of the machine is mounted in bearings at the top of the frame, and carries at one end a band wheel $b$, by means of which it may be connected with any convenient source of power. A spur wheel $b'$, is also secured to this shaft, adjacent to the band wheel, and meshes with a gear wheel $b^3$, secured to one end of a second transverse shaft B', mounted in bearings near the longitudinal center of the frame, and just below the guide passage thereof. The other projecting end of the shaft B' is provided with a pinion $b^4$, which meshes with a large gear wheel $b^5$, secured on the projecting end of a transverse shaft $B^2$, and also with a gear wheel $b^6$, secured on the projecting end of another transverse shaft $B^3$. The shaft $B^2$ is mounted at the rear of the frame, in bearings in horizontal alignment with the guide passage thereof, and is provided centrally with a crank $b^7$. The shaft $B^3$ is mounted in bearings beneath the carriage C, near the front end of the frame, and is provided with a cam or wiper $B^4$, composed of three parallel arms $b^8$, a pin $b^9$ connecting the outer ends of these arms, and two friction rollers $b^{10}$, mounted upon the pin $b^9$ between the central and outer arms.

The central cross-girt $a'$ of the frame is provided with three forwardly projecting lugs $a^7$, having apertures to receive a spindle $a^8$, upon which two cylindrical sleeves or friction rolls $a^9$, are mounted to give support to the carriage C and reduce friction on the ways $A^3$; their upper surfaces to this end being flush with the flanges $A^3$ $A^3$ of the frame.

The reciprocating carriage C (Fig. 13) is a metal block of rectangular outline, having a broad recess at its outer end, and is mounted upon the ways or flanges $A^3$ $A^3$ forming a part of the guide passage of the frame. Flanges $c$, project upwardly from the sides of the carriage C, at its rear or inner end, and bear with their upper surfaces against the top plate A' of the frame to prevent the rear of the carriage C from rising from the flanges $A^3$ $A^3$ on which it slides.

A block C', of the same height as the flanges $c$, is located near the front of the table, and centrally between its side edges, and extending beyond or forward of this block C' is a tongue $C^2$, arranged centrally within the recess at the forward end of the carriage and upon which a die or former D, is secured; said die or former acting in conjunction with the pairs E E' of rolls, upon the rearward movement of the carriage, to give a blank the right angled bends $h'$ for forming the central loop $h$ (Fig. 12). During this operation the center of the blank H is held securely against the leading face of the die D by a clamp plate $C^3$, provided on each side with dovetailed tongues $c^3$, adapted to slide within similarly shaped grooves $c'$, formed in the sides of the block C' (Figs. 8 and 9) and, to throw the clamp plate $C^3$ toward the die D for holding a blank against the same, a recess $c^2$ is provided in the outer end of the block C', within which recess a cam $C^4$, is pivoted, its free end bearing upon the clamp plate, and normally, projecting slightly above the block C'. Upon the rearward or inward movement of the carriage the exposed part of the cam will be depressed by the top beam A (Figs. 2 and 6) to a level with the top of the block C', and will, in its downward movement, force the clamp plate $C^3$ toward the die D thus clamping the blank H firmly against the said die.

To adapt this part of the machine for making stirrups with wider or narrower central loops $h$, a number of interchangeable dies D of various widths are provided, each constructed with a recess $d$, in its under surface to engage a correspondingly shaped boss on the tongue $C^2$, and with vertical bolt holes near its ends for the reception of bolts $d'$ $d^2$, by which the die is rigidly secured to the tongue. To effect a saving of weight, material and labor, the die D is cast with a recess $d^3$, in its outer end, and the head of the attaching bolt $d^2$ is seated in this recess; the head of the bolt $d'$ attaching the inner end of the die to the tongue lies flush with or below the upper face of the die to avoid contact with the upper wall of the guide passage, the hole in which it is seated being countersunk for this purpose. The clamp plate $C^3$ should correspond in width with the width of the die D with which it is used, and to obtain this end, a number of interchangeable plates $C^3$ are provided, their widths corresponding to the widths of the several sizes of dies. These clamp plates are each provided with dovetailed tongues $c^3$, to engage the grooves in the sides of the block C', (Figs. 2, 8 and 9) and it is preferable to secure said block C' removably to the carriage in order that it may also be interchanged with others; each block C' being provided with a clamp plate $C^3$, of corresponding width. To accomplish this end, the carriage C is provided centrally with a longitudinal undercut or T-shaped groove $c^4$, (Figs. 7, 8 and 9) and a feather or spline $c^5$, is formed on the bottom of the block C' to slide within said groove. The head of a bolt $c^6$, is seated in the undercut part of this groove $c^4$, its stem passing upward through a bolt hole in block C' to receive a clamping nut $c^7$, by which the block C' may be rigidly secured to the carriage. This arrangement also provides for the adjustment of the block C' and its clamp plate $C^3$ nearer to or farther from the die D, to accommodate blanks of different thicknesses.

The tongue $C^2$ is removably secured to the carriage C, for a purpose to be hereinafter explained, it being, to this end, constructed in the form of a T-shaped block, (Fig. 7) the head $c^8$ of which is dovetailed to fit a vertical dovetailed groove formed in the outer edge of the carriage. Two vertical series of horizontal bolts $c^9$, pass through the head $c^8$ of this block and into the carriage, their inner ends projecting within vertical slots $c^{10}$, formed in the carriage on either side of the T-shaped groove, to receive nuts $c^{11}$, as best illustrated in Figs. 7, 8 and 9.

A reciprocating motion is imparted to the carriage from the crank $b^7$ of the shaft $B^2$ by a pitman $B^5$ engaged at one end with said crank and at its other end with a bolt $C^5$, the ends of which are embedded in, or secured to the carriage at opposite sides of a deep notch $C^6$, in the center of the inner edge of the carriage.

As before stated, the male die D in forming the central loop $h$ of a stirrup or hanger, acts in conjunction with two pairs of rollers E and E' which operate to bend the blanks and to press the same against the sides of the die. The rollers E' of the outer pair of rollers are journaled on studs $e'$, which are carried in brackets F, projecting from the front of the cross-beam $A^2$. These rollers E', which impart the initial bends to the blank at the points $h'$ $h'$, are arranged a distance from the sides of the die D equal to the width of the blank H to be operated upon, and the adjacent surfaces of these rollers E' are aligned with the adjacent surfaces $f$ of the brackets F, for a purpose hereinafter explained. The rollers E E of the inner pair are journaled on vertical studs $e$, secured in place by stems thereon which pass through the cross-beam $A^2$, and are screw-threaded at their upper ends to receive clamping-nuts $e^2$. These rollers are located at a distance from the sides of the die D equal to the thickness of the blank to be operated upon and operate to complete the bends $h'$ $h'$ forming the central loop $h$ of the stirrup or hanger, by folding or pressing the sides $h^2$ $h^2$ of the stirrup flat against the sides of the die D. The stems of the studs $e$ are seated in transverse slots $a^2$, formed in the beam $A^2$, whereby these studs with their rollers E may be adjusted laterally to accommodate blanks of greater or less thickness, or a die D of greater or less width.

To admit of the lateral adjustment of the rollers E' E' of the outer pair of rollers, and the adjacent surfaces $f$ of their supporting brackets F, the said brackets are adjustably secured to the outer face of the beam $A^2$ by bolts $f'$, the heads of which are seated, and adapted to slide in, a horizontal T-shaped groove formed in said outer face of the beam $A^2$. The outer ends of these bolts $f'$ are threaded to receive clamp nuts $f^2$ by means of which the brackets F are rigidly secured after adjustment.

A guide block F' is removably secured to the face of the top beam $A^2$ at the center, by suitable bolts, its outer end terminating flush with the outer ends of the laterally adjustable brackets F, and at the bottoms of the recesses formed between the block F' and the adjacent side faces $f$ of the brackets F anvil plates $F^2$ are secured; said plates extending upward across the face of an anvil beam $A^7$, which is seated in a rabbet formed in the top of beam $A^2$, and removably secured to said beam by bolts. The side faces of the block F' and the side faces of the brackets F are in vertical alignment with the sides of the die D of carriage C, and the adjacent faces of the rollers E' of the outer pair of rolls. It follows therefore that the recesses between the block F' and the brackets F are of a width equal to the width of the blank, as are also the anvil plates $F^2$ which are secured against the faces of the beams $A^2$ and $A^7$ at the bottoms of said recesses. The anvil plates $F^2$ terminate at their tops flush with the upper face of a plate $A^8$, secured to the upper edge of the beam $A^7$ by the bolts which secure said beam to the beam $A^2$.

Figures 13, 14:
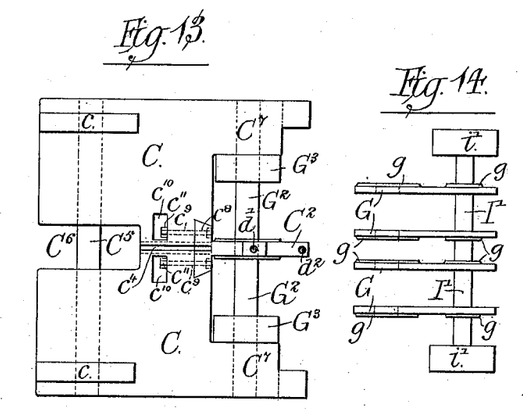
Fig. 13 is a plan view of the reciprocating carriage.
Figs. 14 and 15 are details showing the links and their twisting dies in plan view.
Figure 15:
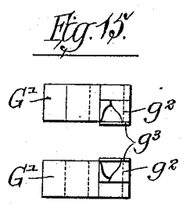
Figure 16:
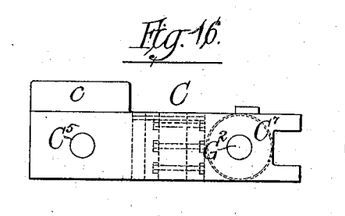
Figs. 16, 17 and 18 are side elevations of the parts shown in Figs. 13, 14 and 15.
Figure 17:
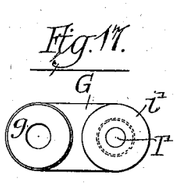
Figure 18:
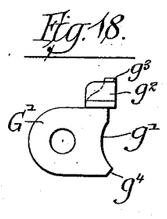

The mechanism for completing the hangers, or making the final bends in the hanger after the central loop is formed, comprises swinging arms consisting of two pairs of links G, pivoted to the carriage C and carrying dies $g^2$ for forming a quarter twist in the legs $h^2$ $h^2$ of the hanger, a pair of bending levers I, pivoted to the outer ends of the links G, and arms J, pivoted to the levers I, and operating to give the final bends $h^5$ to the blank. The structural details and operation of these parts are as follows: A horizontal, transversely arranged spindle $G^2$ extends across the recess at the outer end of the carriage C, the same being secured in horizontal apertures in the extensions $C^7$ forming the sides of said recess, and passing through the tongue $C^2$ (Fig. 13). The inner ends of two pairs of links G, are pivoted on this spindle, one pair on each side of the tongue $C^2$, and between the links of each pair is fitted a block G', the inner end of which is also supported by direct or pivoted engagement with the spindle $G^2$. The outer ends of these blocks have transverse concave surfaces $g'$ $g'$, curved upon arcs to fit the cylindric hubs $i$ of the bending levers I (Figs. 2 and 3), and these bending levers I are fulcrumed on a horizontal spindle I', which passes through the outer ends of the links G, and is fitted at its ends with rollers $i'$, which rest and travel upon the flanges or ways $A^4$ of the frame (Figs. 1, 2, 3, 4, and 6), thus affording support for said links and the parts connected thereto. The outer sides of the links G are provided with circular bosses $g$, through the centers of which the spindles $G^2$ and I' pass, these bosses serving not only to give strength to the links, and broaden the bearings on the spindles, but also to reduce the surface subjected to frictional contact with adjacent parts and to space said links at proper distances from said adjacent parts. Spacing rolls or washers $G^3$, are mounted on the spindle $G^2$, between the outer links G of each pair of links and the extensions of the die blocks G'.

A twisting die $g^2$ is secured to or forms a part of each block G', said twisting dies being arranged to move in contact with the sides of the die D, as they rise to form the twist $h^6$ in the legs $h^2$ of the blank. The working faces of the twisting dies $g^2$ are convex at the outer sides and concave at the inner sides, by which construction the lower edges of the blank are retained in proximity to the sides of die D and its upper edges are turned outward away from said die D, guard flanges $g^3$ being arranged to project upward from the inner edges of the flat top surfaces of the said dies $g^2$ to engage the inner edges of the blank and thus prevent undue friction between the inturned edges of the blank and the sides of the die D, while the sides of the blank are being forced upward against the top wall of the guide passage, in alignment with the upper edges of the blank, by said flat top surfaces of the dies $g^2$.

The bending levers I are provided below their fulcrums with broad surfaced curved extensions or horns $I^2$, and above their fulcrums with detachable plates $i^2$ having working faces to support the blank, and of a width equal to the width of the blank to be operated upon. In the sides of these working faces $i^2$, are formed T-shaped grooves to receive the heads of bolts $j$, on which the bending arms J are pivoted, and also the heads of bolts $j'$, which support the brackets J'. The outer ends of the bending arms J are connected by links $j^2$ with the lower ends of levers $J^2$ fulcrumed in the brackets J'. A feed table K extends transversely across the front of the guide passage of the frame at a point where the die D and clamp plate $C^3$ reach their outer limit of movement during the reciprocation of the carriage C, and to insure the engagement of said die and clamp plate with the center of the blank H placed upon the machine, a gage $k$, is secured adjustably to one end of said table by a bolt $k'$, the head of which is seated in a T-shaped longitudinal groove $k^2$ formed in the upper surface of this end of the feed table K. The blank H is placed in position upon the feed table K, between the face of die D and the clamp plate $C^3$ when the carriage C and the parts connected therewith are at the outermost limit of their movement, as shown in Figs. 1 and 2, and as the carriage starts on its inward movement the upper or exposed part of the pivoted cam $C^4$ will be depressed by its contact with the upper wall of the guide passage, thus moving the clamp plate $C^3$ outward to clamp the blank against the face of the die D. As the carriage C continues its inward movement, the blank will first encounter the rollers E' of the outer pair of rolls, and receive the initial bends at the points $h'$. The blank is next brought under the action of the rollers E of the inner pair of rolls which complete the bends $h'$ by bending the blank flat against the sides of the die D, the outer ends of the blank moving laterally over the unobstructed surface of the feed table K. Meanwhile the links G and their accompanying parts have been carried forward with the carriage, and as the rollers $i'$, at the ends of the spindle I' mount the inclined surfaces $a^6$ of the ways $A^4$ the twisting dies $g^2$ are forced upward thereby to form the quarter twists $h^6$ in the sides or legs $h^2$ of the blank, (Figs. 5 and 6.)

As before stated, the leading faces of the dies $g^2$ are inclined inwardly and downwardly toward the die D, and as the legs $h^2$ stand outward slightly from the sides of said die D at the point where the twisting dies $g^2$ are brought in contact with them, the lower edges of the legs $h^2$ will be thrown inwardly by said inclined surfaces of the dies $g^2$, toward the die D, thus insuring the proper direction to the twists $h^6$, and as the lower edges of the legs $h^2$ of the blank are carried upward toward the upper wall of the guide passage, the upper edges thereof will be forced outward away from the die D, their outward movement being limited by contact with the rolls E' E' of the outer pair of rolls, (see Fig. 4.) The cam or wiper $B^4$ now engaging the horns $I^2$ of the bending levers I (Fig. 6), rocks said levers on the spindle I' to bend the ends of the blank up flat against the anvil plate $F^2$ on the outer faces of the beams $A^2$ and $A^7$, thus forming the bends $h^4$. The friction rolls or sleeves $a^9$, mounted in front of the central frame beam $a'$, are so located as to support the links G and die blocks G' during the entire operation of forming the quarter twists $h^6$ in the legs $h^2$ of the blank. As the bending levers I approach a vertical position, the outer ends of the levers $J^2$ come in contact with a cross-bar $A^5$, the ends of which are connected with two standards $A^6$, rising from the sides of the top plates A', and these levers $J^2$ are actuated thereby to move the outer ends of the pivoted arms J downward, thus bending the extreme ends of the blank beyond the points $h^5$ flat against the upper face of the top-plate $A^8$, and forming the hooks $h^7$ (Fig. 3). The hanger or stirrup being now completed, the cam or wiper $B^4$ moves past the ends of the horns $I^2$ of the bending levers I, permitting said levers to fall to the position shown in Fig. 2, where they are arrested by the contact of the shoulders $i^3$ on their hubs, with shoulders $g^4$ extending from the lower ends of the concaves $g'$ of the die blocks G' to the lower edges of said die blocks. To avoid undue shock to the parts, due to the falling of the bending levers I, a conveniently located counterweight (not shown) is connected with the outer ends of said bending arms I by a rope or chain L.

The mechanism last described may be adjusted laterally to operate upon blanks of greater width by the following devices: The rollers E' of the outer pair of rolls, which serve as guides for the outer edges of the blank after it has received its quarter twists $h^6$, are adjusted laterally by the proper adjustment of their supporting brackets F, secured to the face of the top beam $A^2$ by the bolts $f'$ and nuts $f^2$. The blocks G' are removed by withdrawing the spindle therefrom, through openings $a^{10}$ formed in the frame for that purpose, and other blocks are substituted having dies of a width equal to the width of the blank to be operated on. The working faces $i^2$ of the bending levers I, the bending arms J, and the anvil plates $F^2$ are also removed and replaced by others of a width corresponding with that of the blank. To accommodate a thicker blank, either the plates $i^2$ of the bending levers I, or the anvil plates $F^2$, or both said plates $i^2$ and anvil plates $F^2$, may be removed and replaced by others of a proper thickness, and the pivoted arms J and brackets J', with their levers $J^2$, may be adjusted longitudinally on the bending levers to the position required for their perfect operation.

To adjust the machine for making hangers or stirrups with a wider or narrower central loop $h$, the tongue $C^2$ of the carriage C is removed, with its die D and replaced by another of the required width, and the links G with their die blocks G' and bending levers I, are shifted laterally on the spindles $G^2$ and I', the washers $G^3$ being removed and replaced by others if necessary. The brackets F with their rolls E', and the anvil plates $F^2$ are also adjusted laterally, and the guide block F', is removed and replaced by another of the same width as the die D. The machine may also be adjusted to form stirrups having a greater or less length of arm $h^3$ between the bends $h^4$ and $h^5$, by substituting an anvil beam $A^7$ of greater or less width, and adjusting the pivoted arms J, the brackets J' and the cross bar $A^5$ accordingly. The cross-bar $A^5$ is pivoted eccentrically in its bearings in order to compensate for wear of the levers $J^2$, which operate in conjunction with said beam.

The bending arms J are forked at their lower ends to straddle the upper or working surface $i^2$ of the bending levers I, a slight space intervening between the upper part of the fork of said arms J and the working faces $i^2$ of said bending levers to admit of a free pivotal movement of said arms J, on the said levers I. To prevent the outer ends of the blank H from catching in the upper part of the forks of arms J as the levers I rise to form the bends $h^4$ in said blank, a U-shaped block $J^3$ is secured upon the working faces $i^2$ of the bending levers I, by the bolts $j$ on which the arms J are pivoted, the upper side of this block $J^3$ being curved in an arc corresponding with the arc traversed by said upper part of the forks of arms J, and said upper part of the forks of arms is cut away to the rear whereby the front or working faces of said arms will form a close joint with the upper surface of the block $J^3$ in all positions of adjustment of $J^3$ (see Fig. 2). The block thus serves to guide the end of the blank upon the arm J, without danger of catching.

I claim as my invention—

1. The combination with a reciprocating carriage, a form or die thereon and a guide passage for the carriage, of twisting dies acting against the top of said guide passage, swinging arms pivoted to the carriage and supporting said twisting dies, and tracks or ways adapted for engagement with the free ends of said arms, and provided with inclined parts for moving said arms to actuate the twisting dies, substantially as described.

2. The combination with a reciprocating carriage, a former or die thereon, and a guide passage for the carriage, of twisting dies acting against the top of said guide passage, swinging arms pivoted to the carriage and supporting said twisting dies, bending levers pivoted to the free ends of the said arms, tracks or ways acting on the free ends of said arms and provided with inclined parts for moving said arms to actuate the twisting dies, and stationary surfaces or dies opposed to said bending levers, substantially as described.

3. The combination with a reciprocating carriage, a former or die thereon, and a guide passage for the carriage, of twisting dies acting against the top of said guide passage, swinging arms pivoted to the carriage and supporting said twisting dies, said arms being provided at their free ends with anti-friction rollers, and tracks or ways adapted for engagement with the said rollers, and provided with inclined parts for moving the arms, substantially as described.

4. The combination with a reciprocating carriage, a former or die thereon, and a guide passage for the carriage, of twisting dies acting against the top of said guide passage, swinging arms for supporting said dies comprising links pivoted to the carriage and arranged in pairs at opposite sides of the dies, bending levers pivoted between the outer ends of each pair of links, tracks or ways acting on the free ends of said arms and provided with inclined parts for moving the latter, and stationary surfaces or dies opposed to said bending levers, substantially as described.

5. The combination with a reciprocating carriage, a former or die thereon, and a guide passage for the carriage, of twisting dies, acting against the top of said guide passage, swinging arms for supporting the said dies, each comprising two parallel links, a horizontal pivot rod connecting the said links with the carriage, blocks to which said dies are attached, located between the links and provided with apertures for the passage of the said pivot rod, and tracks or ways adapted for engagement with the free ends of said arms and provided with inclined parts for moving the same, substantially as described.

6. The combination with a reciprocating carriage, a former or die thereon, and a guide passage for the carriage, of twisting dies acting against the top of said guide passage, swinging arms supporting the twisting dies, each comprising two parallel links, a pivot-rod connecting the said links with the carriage, blocks to which said dies are attached, located between the links and provided with apertures for the passage of said pivot rod, bending arms pivoted between the outer ends of the links and provided with cylindric surfaces bearing against the outer ends of said blocks, which latter are provided with concave surfaces fitting against said cylindric surfaces of the bending levers, substantially as described.

7. The combination with a reciprocating carriage, a former or die thereon, and a guide passage for the carriage, of twisting dies acting against the top of said guide passage, swinging arms pivoted to the carriage and supporting said twisting dies, bending levers pivoted to the outer ends of said arms, tracks or ways acting on the free ends of said arms and provided with inclined parts for moving the same, and stationary surfaces or dies opposed to the bending levers, said arms and bending levers being provided with stops or shoulders to limit the outward movement of the bending levers, substantially as described.

8. The combination with a reciprocating carriage, a former or die thereon, and a guide passage for the carriage, of twisting dies acting against the top of said guide passage, swinging arms supporting the twisting dies comprising parallel links, a pivot rod connecting the links with the said carriage, blocks to which said twisting dies are attached, located between the links, bending levers pivoted to the outer ends of the links, said blocks and the bending levers being provided with stops or shoulders to limit the outward or downward movement of the bending levers, substantially as described.

9. The combination with a reciprocating carriage, a former or die thereon, and a guide passage for the carriage, of twisting dies acting against the top of said guide passage, swinging arms pivoted to the carriage and supporting said twisting dies, tracks or ways acting on the free ends of said arms and provided with inclined parts for moving the same, and stationary rollers located beneath the carriage in position to engage the arms when the latter are elevated, substantially as described.

10. The combination with a reciprocating carriage, a former or die thereon, and a guide passage for the carriage, of twisting dies acting against the top of said guide passage swinging arms pivoted to the carriage and supporting said twisting dies and means for detachably supporting the die on the carriage, consisting of a tongue detachably secured to the carriage and extending outwardly between the said swinging arms and adapted to sustain the die on its upper surface, substantially as described.

11. The combination with a reciprocating carriage, a former or die thereon, and a guide passage for the carriage, of means for clamping the blank against the die, comprising a clamp plate movable toward and from the die, a cam pivoted upon the carriage and acting against the rear surface of the clamp plate, said cam extending upwardly into position to engage the top of said guide passage, substantially as described.

12. The combination with a reciprocating carriage, a former or die thereon, and a guide passage for the carriage, of means for clamping the blank against the die comprising a clamp plate, a cam acting against the clamp plate, and a block in which said cam is pivoted, said block being adjustable on the carriage toward and from the die, substantially as described.

13. The combination with a reciprocating carriage, a former or die thereon, and a guide passage for the carriage, of means for clamping the blank against the die, comprising a clamp plate, a cam acting against the clamp plate, and a block in which said cam is pivoted, said block being adjustable on the carriage toward and from the die, and bars upon the clamp plate engaging guide grooves in the said block, whereby the clamp plate is guided in its movement toward and from the die, substantially as described.

14. The combination with a reciprocating carriage, a former or die thereon, and a guide passage for the carriage, of twisting dies, swinging arms supporting said twisting dies, and bending levers pivoted to the free ends of said arms, bending arms pivotally connected with the bending levers, actuating levers also pivotally connected with the bending levers and connected with said bending arms, and means of affording longitudinal adjustment of the bending arms and actuating levers upon the bending levers, consisting of longitudinal, dovetailed grooves on said bending levers, bolts engaging said grooves, on which the said bending arms are pivoted, and a sliding bracket to which the actuating levers are pivoted, said brackets being connected with the bending levers by means of bolts entering the said dovetailed grooves, substantially as described.

15. The combination with a reciprocating carriage, a former or die mounted thereon, and a guide passage for the carriage, of twisting dies, swinging arms supporting said twisting dies, bending levers, bending arms pivotally connected with the bending levers, actuating levers pivotally connected with the bending levers and with said bending arms, and a cylindrical bar upon the machine frame adapted for contact with said actuating levers; said bar being mounted eccentrically upon said frame for the purpose of adjustment, substantially as described.

16. The combination with a reciprocating carriage, a former or die mounted thereon and a guide passage for the carriage, of twisting dies, swinging arms supporting said twisting dies, bending levers pivotally connected with said arms, stationary parts or dies opposed to said bending levers, and means for counterbalancing said bending levers, substantially as described.

17. The combination with a reciprocating carriage, a former or die thereon, and a guide passage for the carriage, of twisting dies acting against the top of said guide passage, swinging arms pivoted to the carriage and supporting said twisting dies, bending levers pivoted to the free ends of said arms, bending arms pivoted to said bending levers, a transverse beam $A^2$, and an anvil beam $A^7$ removably secured to the top of said transverse beam, substantially as described.

18. The combination with a reciprocating carriage, a former or die thereon, and a guide passage for the carriage, of twisting dies acting against the top of said guide passage, swinging arms pivoted to the carriage and supporting said twisting dies, bending levers pivoted to the free ends of said arms, bending arms pivoted to said bending levers, a transverse beam $A^2$, and anvil beam $A^7$ removably secured to said transverse beam, and anvil plates secured against the vertical faces of the said beam $A^2$ and anvil beam $A^7$, substantially as described.

19. The combination with a reciprocating carriage, a former or die thereon, and a guide passage for the carriage, of twisting dies acting against the top of said guide passage, swinging arms for supporting said twisting dies and a transverse pivot rod connecting said swinging arms with the carriage, said arms being adapted to slide laterally upon said rod, and means for holding the arms from lateral movement on the pivot rod, substantially as described.

20. The combination with a reciprocating carriage, a former or die thereon, and a guide passage for the carriage, of twisting dies acting against the top of said guide passage, swinging arms for supporting said twisting dies, and a transverse pivot rod connecting said swinging arms with the carriage, said arms being adapted to slide laterally upon said rod, and means for holding the arms from lateral movement when adjusted, comprising washers or collars placed on the rod between the said arms and the parts of the carriage engaged thereby, substantially as described.

21. The combination with a reciprocating carriage, a former or die thereon, and a guide passage for the carriage, of twisting dies acting against the top of said guide passage, swinging arms pivoted to the carriage and supporting said twisting dies, a tongue detachably secured to the carriage and extending outwardly between said arms for sustaining the said die, a pivot rod for connecting said swinging arms with the carriage passing through said tongue, said arms being adapted to slide laterally upon the said pivot rod, and means for holding the said arms in position adjacent to the said tongue and the die thereon, substantially as described.

22. The combination with a reciprocating carriage, a former or die mounted thereon, and a guide passage for the carriage, of twisting dies, swinging arms supporting said twisting dies, bending levers, bending arms pivotally connected with said bending levers and bending arms, and an inclined block secured at the junction of said bending levers and bending arms, substantially as described.

In testimony that I claim the foregoing as my invention I affix my signature in presence of two witnesses.

JOHN GRANT.

Witnesses:
C. CLARENCE POOLE,
GEORGE W. HIGGINS, Jr.